(12) United States Patent
Ezen Can et al.

(10) Patent No.: US 10,275,456 B2
(45) Date of Patent: Apr. 30, 2019

(54) DETERMINING CONTEXT USING WEIGHTED PARSING SCORING

(71) Applicant: INTERNATIONAL BUSINESS MACHINES CORPORATION, Armonk, NY (US)

(72) Inventors: Aysu Ezen Can, Cary, NC (US); Roberto DeLima, Apex, NC (US); Corville Allen, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/623,613

(22) Filed: Jun. 15, 2017

(65) Prior Publication Data
US 2018/0365219 A1 Dec. 20, 2018

(51) Int. Cl.
*G06F 17/20* (2006.01)
*G06F 17/27* (2006.01)
*G06N 5/04* (2006.01)

(52) U.S. Cl.
CPC ........ *G06F 17/2785* (2013.01); *G06F 17/274* (2013.01); *G06F 17/2705* (2013.01); *G06F 17/278* (2013.01); *G06N 5/043* (2013.01)

(58) Field of Classification Search
CPC ...... G06F 17/20; G06F 17/21; G06F 17/2229; G06F 17/2247; G06F 17/2252; G06F 17/227; G06F 17/2282; G06F 17/27; G06F 17/2775; G06F 17/278; G06F 17/2785
USPC .......................................... 704/9, 1, 3, 5, 10
See application file for complete search history.

(56) References Cited

U.S. PATENT DOCUMENTS

| | | | |
|---|---|---|---|
| 8,504,355 | B2 | 8/2013 | Ylonen |
| 9,280,535 | B2 | 3/2016 | Varma et al. |
| 9,336,205 | B2 | 5/2016 | Moilanen et al. |
| 9,754,021 | B2 | 9/2017 | Byron et al. |
| 9,959,341 | B2 * | 5/2018 | Curin ................ G06F 17/30684 |
| 2009/0012842 | A1 | 1/2009 | Srinivasan et al. |
| 2010/0042576 | A1 * | 2/2010 | Roettger ............. G06F 17/2211 706/55 |
| 2013/0179151 | A1 | 7/2013 | Iverson |

(Continued)

FOREIGN PATENT DOCUMENTS

EP 0268367 A2 5/1988

OTHER PUBLICATIONS

IBM: List of IBM Patents or Patent Applications Treated As Related (Appendix P), Mar. 9, 2018, pp. 1-2.

(Continued)

*Primary Examiner* — Qi Han
(74) *Attorney, Agent, or Firm* — Robert D. Bean

(57) ABSTRACT

According to one embodiment, a method, computer system, and computer program product for natural language processing is provided. The present invention may include detecting natural language entities, and running parsing algorithms on the natural language entities to determine the relationship between said natural language entities. The present invention may further comprise assigning, by the parsing algorithms, initial scores to detected natural language entities based on the relationship between said natural language entities; choosing a final score for plurality of natural language entities; and comparing the final score against a threshold to determine whether the natural language entities are within the same context.

17 Claims, 8 Drawing Sheets

(56) References Cited

U.S. PATENT DOCUMENTS

| | | | |
|---|---|---|---|
| 2013/0268262 A1* | 10/2013 | Moilanen | G06F 17/28 704/9 |
| 2014/0236570 A1* | 8/2014 | Heck | G06F 17/2785 704/9 |
| 2014/0280256 A1 | 9/2014 | Wolfram et al. | |
| 2016/0070693 A1 | 3/2016 | Carrier et al. | |
| 2016/0148096 A1 | 5/2016 | Bornea et al. | |
| 2016/0321357 A1 | 11/2016 | Novacek et al. | |
| 2017/0185893 A1 | 6/2017 | Wetta | |
| 2018/0082183 A1 | 3/2018 | Hertz et al. | |

OTHER PUBLICATIONS

Mell et al., "The NIST Definition of Cloud Computing," U.S. Department of Commerce, National Institute of Standards and Technology, Sep. 2011, p. 1-7, Special Publication 800-145.

Voskarides, et al., "Learning to Explain Entity Relationships in Knowledge Graphs", Proceedings of the 53rd Annual Meeting of the Association for Computational Linguistics and the 7th International Joint Conference on Natural Language Processing, pp. 564-574, Beijing, China, Jul. 26-31, 2015, copyright 2015 Association for Computational Linguistics.

Cucerzan, "Large-Scale Named Entity Disambiguation Based on Wikipedia Data", Proceedings of the 2007 Joint Conference on Empirical Methods in Natural Language Processing and Computational Natural Language Learning, pp. 708-716, Prague, Jun. 2007, copyright 2007 Association for Computational Linguistics.

Bunescu, et al., "Using Encyclopedic Knowledge for Named Entity Disambiguation", In Proceedings of the 11th Conference of the European Chapter of the Association for Computational Linguistics (EACL-06), pp. 9-16, Trento, Italy, Apr. 2006.

* cited by examiner

DETERMINING CONTEXT USING WEIGHTED PARSING SCORING

BACKGROUND

The present invention relates, generally, to the field of computing, and more particularly to the field of natural language processing.

Natural language processing is a field of computing concerned with interactions between computers and natural human languages. As computing power has become cheaper, faster, and more powerful, many companies are rushing to develop personal assistants capable of communicating with humans using natural language for phones, tablets, computer operating systems and even purpose-built home automation appliances to provide intuitive machine-man interfacing. As such, the field of natural language processing has massively grown in relevance in recent years, and streamlining the process is of immense commercial importance. A primary goal of the field is to enable computers to successfully process large corpora of natural language text. Achieving this goal requires that computers understand not only the denotative meaning of the text, but the connotative meaning as well; the definition of words can change depending on context. Consequently, an understanding of natural language requires an understanding of the context within which that language appears, which complicates the process of creating effective natural language processors.

SUMMARY

According to one embodiment, a method, computer system, and computer program product for natural language processing is provided. The present invention may include detecting natural language entities, and running parsing algorithms on the natural language entities to determine the relationship between said natural language entities. The present invention may further comprise assigning, by the parsing algorithms, initial scores to detected natural language entities based on the relationship between said natural language entities; choosing a final score for plurality of natural language entities; and comparing the final score against a threshold to determine whether the natural language entities are within the same context.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
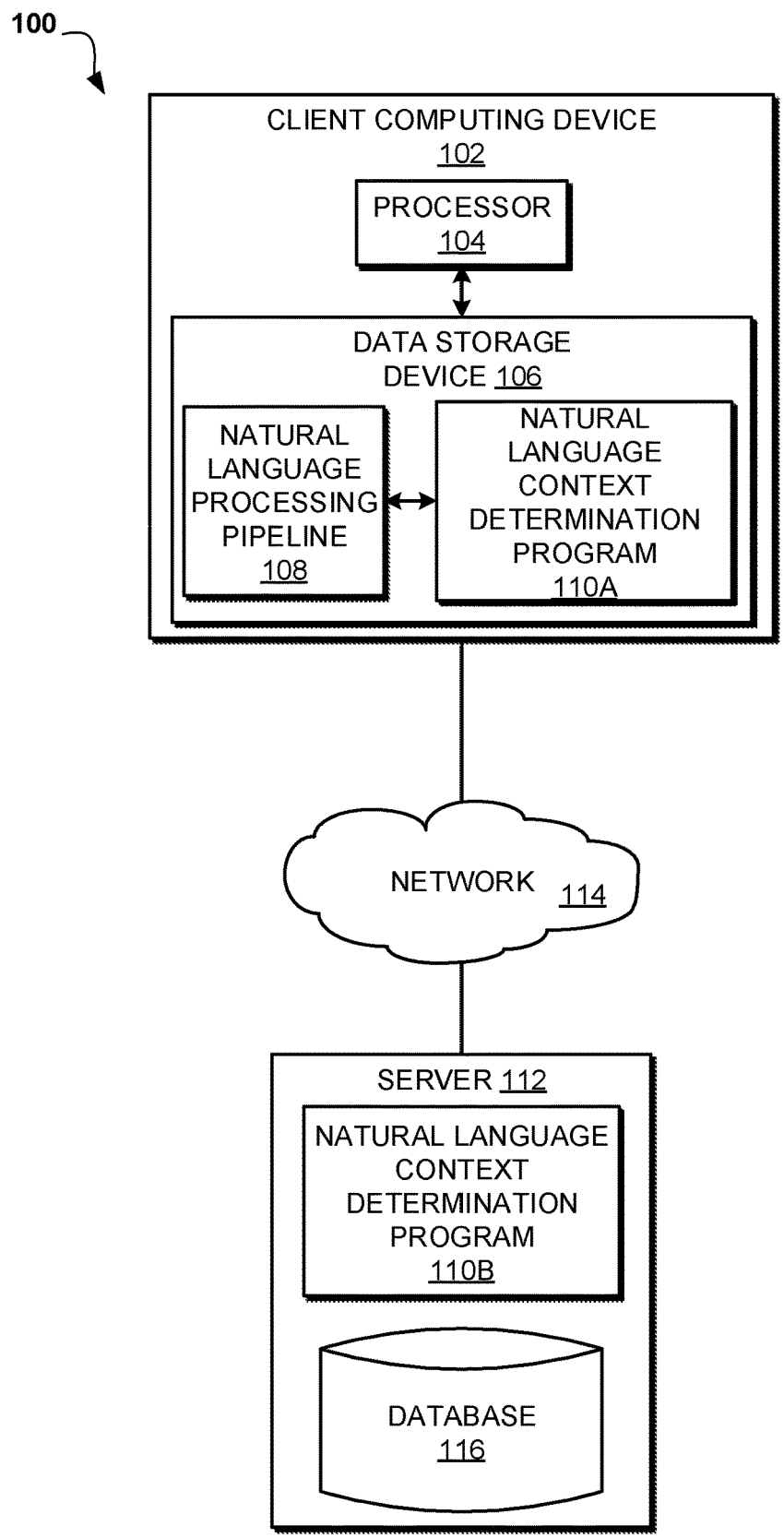
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to the field of natural language processing. The following described exemplary embodiments provide a system, method, and program product to, among other things, utilize linguistic and lexical features to enumerate the relationship between natural language entities. Therefore, the present embodiment has the capacity to improve the technical field of natural language processing by offering a natural language processing solution that is domain-independent; the presented embodiment of the invention utilizes generalizable natural language processing algorithms that are generic enough such that developers would not need to write rules with different intervening tokens to be able to make a connection between pairs of entities. Furthermore, the present embodiment of the invention has the advantage of being capable of multiple applications, such as co-reference resolution (if two entities are related to each other, the entities could be combined to obtain a more complete understanding of the larger entity, determining more specific features of the larger entity), summarization (if two entities are related both should be present in the summary), and question answering (for more concrete answers, it is necessary to find hidden relationships in the text).

As previously described, natural language processing is a field of computing concerned with interactions between computers and natural human languages. A primary goal of the field is to enable computers to successfully process large corpora of natural language text. Achieving this goal requires that computers understand not only the denotative meaning of the text, but the connotative meaning as well; the definition of words can change depending on context. Consequently, an understanding of natural language requires an understanding of the context within which that language appears. Determining context in rich natural language is a challenging task; there are many different ways of articulating the same meanings. Furthermore, the wordings change from one context to another; as an example, the algorithms used to determine if two entities that are in the same context in a medical application may not be the same as the algorithms that are applied in a financial context. Rule-based approaches make it difficult to scale natural language understanding algorithms, and therefore the rules need to be rewritten every time a new corpus is introduced for a different domain.

The task of relating entities that are relevant to each other is an important one for several applications, including co-reference resolution, summarization and question answering. In order to draw a higher level picture of a textual document, it is crucial to incorporate semantics, i.e., understanding the entities that have connection. The prior art has struggled to produce methods of parsing natural language entities to enumerate the quality of relationships between said entities in a fashion that is efficient and scalable. Therefore, it is desirable to, among other things, provide domain-independent, generalizable natural language processing algorithms that are generic enough so that developers would not need to write rules with different intervening tokens to be able to make a connection between pairs of entities. Most of the time, relating entities directly impacts disambiguation; an example could be classifying a measurement as a tumor measurement, lymph node measurement, or a margins distance. Once the algorithm knows that the measurement is related to a mass, the size can be disambiguated and classified as a tumor measurement. It is further desirable to provide a method of natural language processing that has multiple applications, such as co-reference resolution (if two entities are related to each other, the entities could be combined to obtain a more complete understanding of the larger entity, determining more specific features of the larger entity), summarization (if two entities are related both should be present in the summary), and question answering (for more concrete answers, it is necessary to find hidden relationships in the text).

According to one embodiment, the invention is a computer program capable of utilizing linguistic and lexical features to be able to construct a score enumerating the relationship between pairs of natural language entities, where the higher the score, the greater the likelihood that the entities are related. The framework utilizes a set of parsing algorithms, run simultaneously to determine multiple scores. Punctuation and conjunctions are used to further adjust scores returned by each algorithm. Then the scores are sorted and if the highest score that is returned by the set of parsing algorithms is below a pre-defined threshold, the two entities are accepted as related and the highest score is assigned as the confidence for this conclusion.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to utilize linguistic and lexical features to formulate a score that enumerates the likelihood that two natural language entities are contextually related.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a natural language processing pipeline 108 and a natural language context determination program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 6, the client computing device 102 may include internal components 602a and external components 604a, respectively.

The server computer 112 may be a laptop computer, netbook computer, personal computer (PC), a desktop computer, or any programmable electronic device or any network of programmable electronic devices capable of hosting and running a natural language context determination program 110B and a database 116 and communicating with the client computing device 102 via the communication network 114, in accordance with embodiments of the invention. As will be discussed with reference to FIG. 6, the server computer 112 may include internal components 602b and external components 604b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

Natural language processing pipeline 108 may be any computer program or combinations of computer programs capable of accepting natural language as an input, and processing natural language into a state that is computer-readable, and may further be capable of performing actions or serving requests derived from the natural language input. The natural language processing pipeline 108 may serve as part of a medical treatment recommendation system, such as IBM Watson® (IBM Watson® and all IBM Watson® based trademarks and logos are trademarks or registered trademarks of International Business Machines Corporation and/or its affiliates), where co-reference resolution is conducted, or natural language processing pipeline 108 may be in a dialogue manager, such as Ski® (Siri® and all Siri® based trademarks and logos are trademarks or registered trademarks of Apple Inc. and/or its affiliates), that determines related entities to better generate a system response.

According to the present embodiment, the natural language context determination program 110A, 110B may be a program capable of utilizing linguistic and lexical features to determine whether two entities in a textual document are related in a generic way. The natural language context determination method is explained in further detail below with respect to FIG. 2. In one embodiment, natural language context determination 110A, 110B may be intended to run in the natural language understanding step of a natural language processing pipeline 108.

Figure 2:
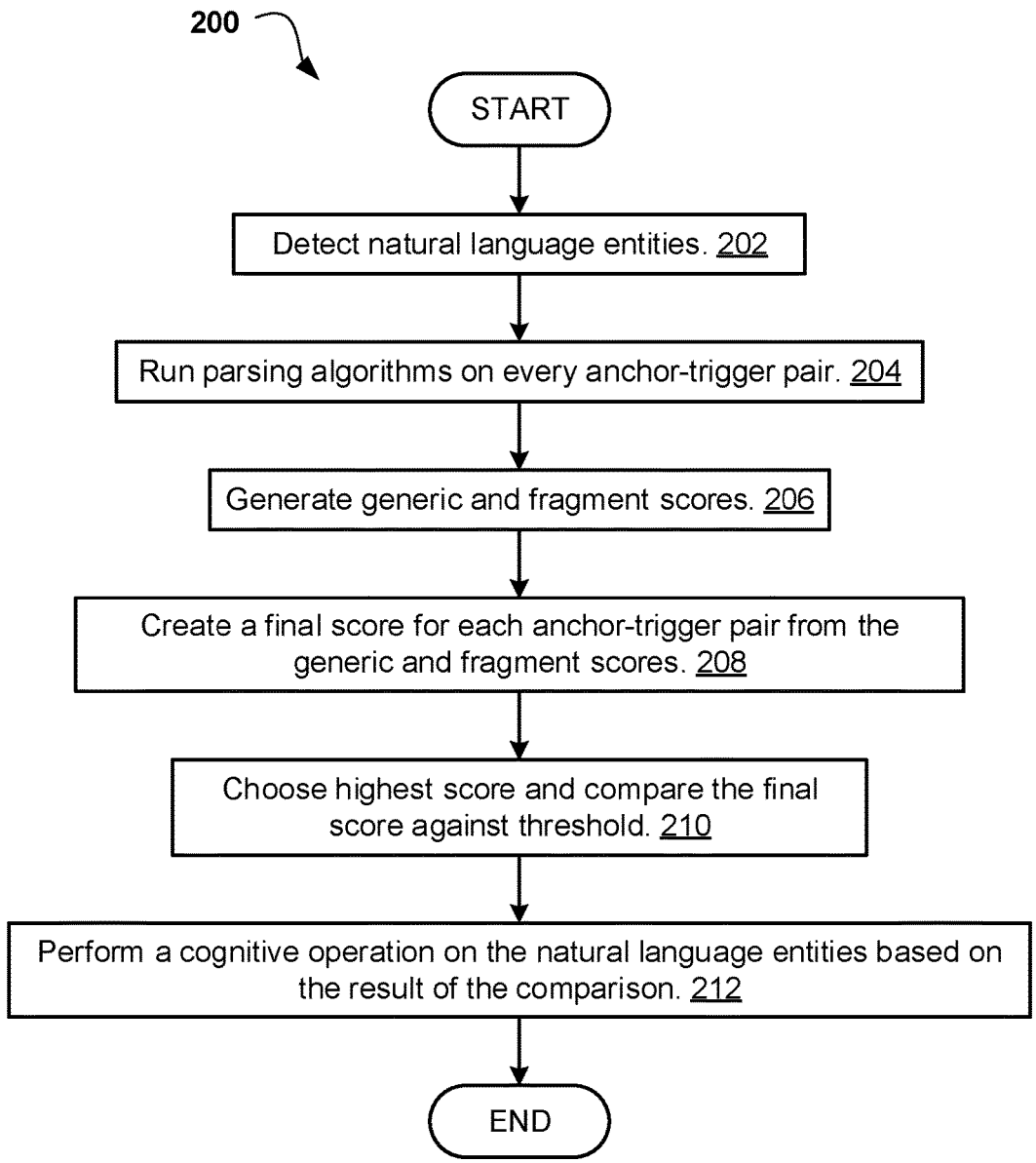
FIG. 2 is an operational flowchart illustrating a natural language determination process according to at least one embodiment.

Referring now to FIG. 2, an operational flowchart illustrating a natural language context determination process 200 is depicted according to at least one embodiment. At 202, the natural language context determination program 110A, 110B detects natural language entities. A natural language entity may be a semantic categorization of a token or a group of tokens based on the requirements of the natural language context determination process. For instance, "3 cm" is an entity, specifically an observation size. "Mass" is an entity, specifically a tumor trigger. The natural language context determination program 110A, 110B annotates entities in text to make sense of unstructured text and use those entities to derive conclusions. For example, in at least one embodiment, observation size and tumor trigger are related, therefore 3 cm should be a tumor measurement, which then becomes a tumor measurement entity. The entities may be detected by natural language processing pipeline 108 using semantic parsers or other methods known to the art.

Next, at 204, natural language context determination program 110A, 110B runs parsing algorithms on every anchor-trigger pair. An anchor-trigger pair may be a pair of entities that natural language context determination program 110A, 110B attempts to find the relationships between. The term 'anchor' represents an entity around which natural language context determination program 110A, 110B will search for triggers. Here, the assumption is that there should be triggers in the context of an anchor, so that the anchor and trigger would be related (i.e. in the same context). Anchors and triggers are simply entities but depending on what relationship natural language context determination program 110A, 110B wants to find, one entity may be treated as an anchor and another may be treated as a trigger. The purpose of the parsing algorithm may be, among other things, to parse out natural language text in a language tree structure and identify entities and relationships within that language. The algorithm may further evaluate anchor-trigger pairs in order to compute whether each pair is in the same context, and return a score which serves to enumerate the contextual relationship between the anchor and the triggers. These parsing algorithms may include, among others, parse tree relationship algorithms, shortest path algorithms, and fallback algorithms. There is no minimum or maximum number of parsing algorithms that can be run; natural language context determination program 110A, 110B may incorporate multiple parsing algorithms and prioritize their results based on the scores the parsing algorithms return. The parse tree relationship algorithm is further depicted in FIG. 3; child-parent relationships within the parse tree relationship algorithm are further illustrated in FIG. 4.

Figure 5:
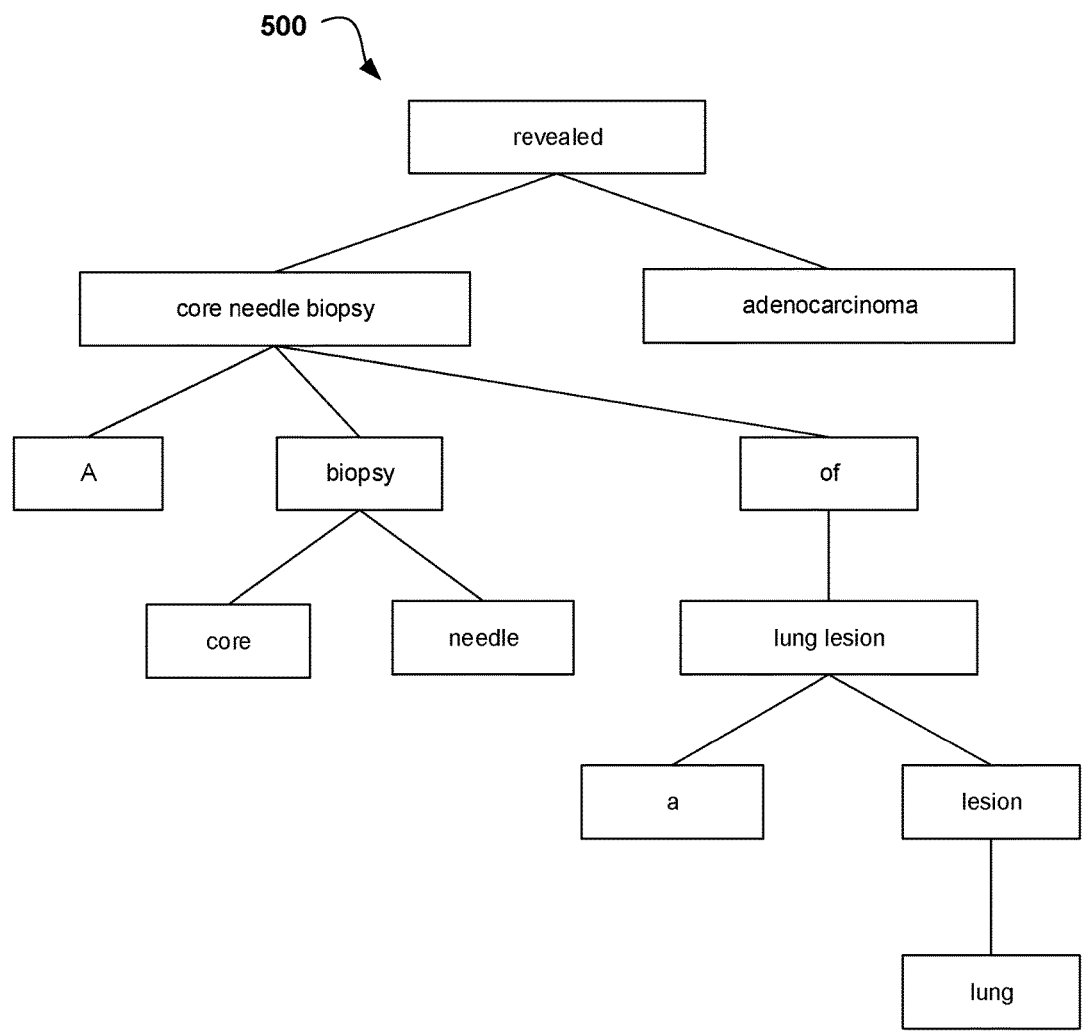
FIG. 5 is a functional block diagram illustrating a shortest path algorithm according to at least one embodiment.

The shortest path algorithm may also be used; like the parse tree relationship algorithm, this algorithm utilizes a parse tree, and calculates the distance of the shortest path from one node to another to produce its score. An example of this algorithm is illustrated in FIG. 5.

The fallback algorithm is another suitable algorithm. The fallback algorithm is run only when a parse tree is incomplete; as such, the algorithm utilizes proximity-based rules, and no parse tree. The assumption behind the fallback algorithm is that two entities are more likely to be related to each other if the entities are closer in the sentence. The algorithm calculates the score based on the normalized distance between the anchor and the trigger, and prioritizes anchor-trigger pairs that are closer in the sentence.

Then, at 206, natural language context determination program 110A, 110B generates generic and fragment scores. The generic score is the score returned by an algorithm, and therefore may differ according to which algorithm was used. The fragment score is adjusted version of the generic score where punctuation/conjunction weights have been taken into account. For example, if the conjunction "and" has a weight of 0.1 and the generic score is 0.8, the fragment score would be =0.8−0.1=0.7. With a negative weight example such as "/", if the weight is 0.5, and the generic score is 0.8, the fragment score would be =0.8−0.5=0.85. Every punctuation/conjunction entity has its own weights which may increase or decrease the score. Additionally, the generic score may be used to further adjust each segment; if the anchor-trigger pair is within the same fragment, the score increases and becomes the new fragment score. If the anchor-trigger pair is not within the same fragment, the likelihood of their being related is less, which will decrease the score. Each fragment is a segment of the tree as divided by conjunctions. The fragment score is lowered if anchor and trigger are in separate fragments. For instance, in the example where a chest cat scan reveals a 4 cm right upper lobe mass and a 3 cm right mediastinal lymph node, the anchors are 4 cm and 3 cm, and the triggers are mass and mediastinal lymph node. Since 4 cm and mass are in the same fragment, but 4 cm and mediastinal lymph node are not, the likelihood of 4 cm being related to mass is higher than the likelihood of 4 cm being related to mediastinal lymph node. Therefore, natural language context determination program 110A, 110B may conclude that 4 cm is a tumor measurement (as the measurement is connected to a mass), and 3 cm is a lymph node measurement (as the measurement is connected to the mediastinal lymph node).

Next, at 208, natural language context determination program 110A, 110B creates a final score for each anchor-trigger pair from the generic and fragment scores. Natural language context determination program 110A, 110B may use different combinations of generic scores and fragment scores in determining the final score, for instance where there is no conjunction in the sentence, or where the generic score and the fragment score are the same. Every anchor-trigger pair will have a generic and a fragment score. The combination may be an average, a weighted average, the lowest score, or the highest score. Alternatively, natural language context determination program 110A, 110B may also use the unaltered generic or fragment score as the final score. The current embodiment contemplates the use of unaltered fragment scores as the final score for each anchor-trigger pair, because the addition of conjunctions and punctuation information may increase accuracy, at the expense of resource intensity.

Then, at 210, natural language context determination program 110A, 110B chooses the highest final score and compares that final score against a threshold. The threshold is a number above which a final score is high enough that the corresponding anchor-trigger pair is considered related, and below which the final score represents an anchor-trigger pair that is not related. This threshold is provided to the process as an input, and can be formulated by means of several methods, including empirical data that is collected and analyzed to create the optimal threshold, or by machine learning. One example of the former method may entail taking two entities that are already known to be connected, and setting an arbitrary threshold to see if the algorithms actually return the expected "connected" result. This process is then repeated for several anchor-trigger pairs. The initial threshold is then modulated to produce a number that maximizes the number of correct relations.

The highest final score is selected from among all of the scores returned for each anchor trigger pair by different parsing algorithms. Natural language context determination program 110A, 110B may also take into account the scores for all triggers given an anchor. In alternate embodiments, natural language context determination program 110A, 110B may choose a different score based on the implementation logic; natural language context determination program 110A, 110B may choose to only use the top score, or may utilize all triggers that have a score above a threshold for the given anchor. Once the scores are determined for anchor-trigger pairs in a sentence, it is up to the remaining logic to decide which triggers to use. The goal of these parsing algorithms is to determine which anchor-trigger pairs are in the same context.

Next, at 212, natural language context determination program 110A, 110B performs a cognitive operation on the natural language entities based on the result of the comparison. These cognitive operations may include answering a natural language input question, generating search results, identifying related portions of content, identifying related concepts in multiple documents, or scoring related concepts. In an alternate embodiment, natural language context determination program 110A, 110B may choose to perform no cognitive operation, and/or may instead pass the results of the context determination to the natural language processing pipeline 108.

Figure 3:
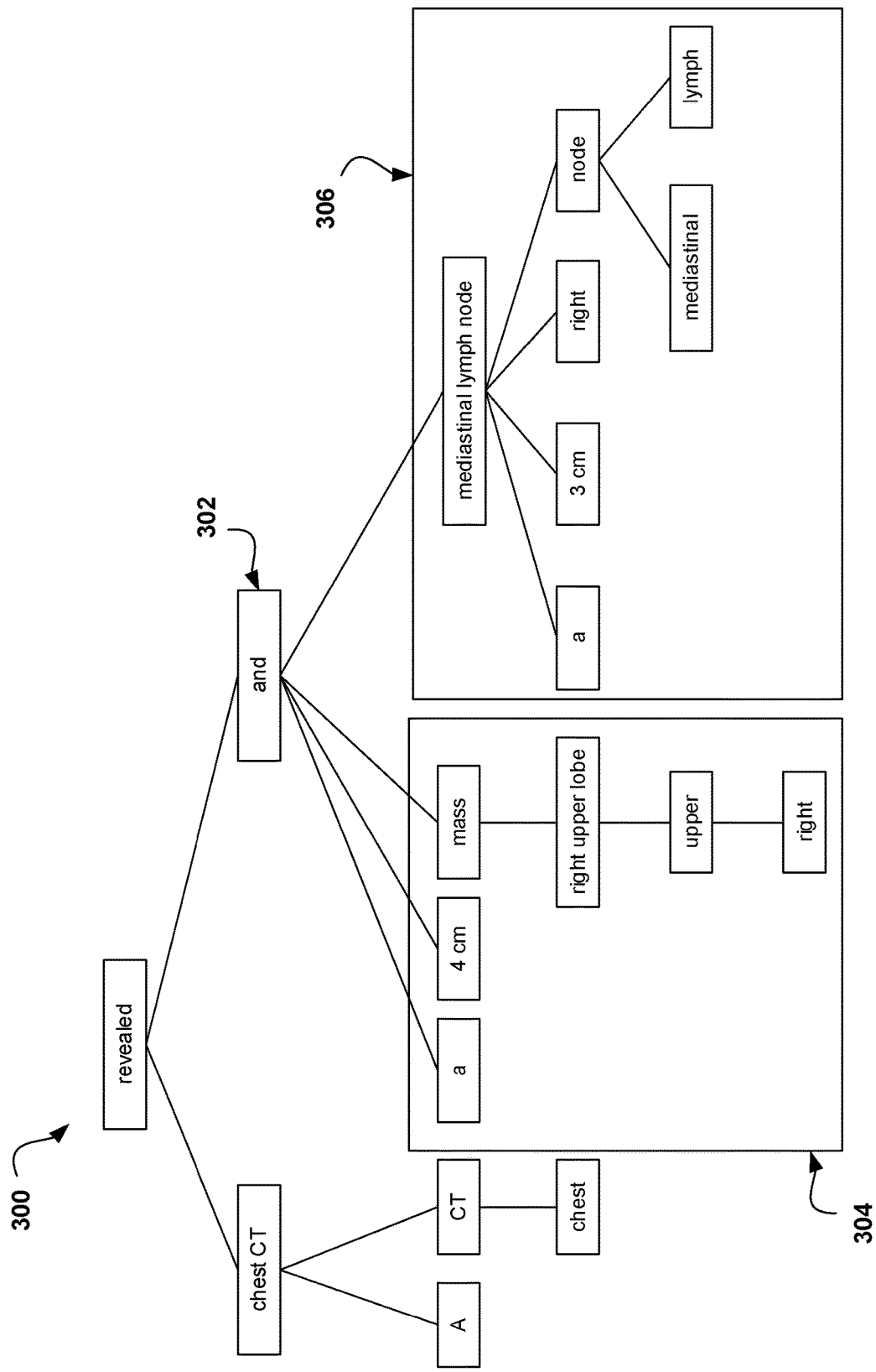
FIG. 3 is an exemplary segment block diagram illustrating a parse tree relationship algorithm according to at least one embodiment.

FIG. 3 is an exemplary segment block diagram 300 illustrating an exemplary segment of natural language parsed out by the parse tree relationship algorithm. The parse tree relationship algorithm parses natural language into a tree structure, consisting of a series of linked nodes branching downwards from a single root value to reflect the syntax of the input language; in this figure, the root value is a verb, and the child nodes are parsed out according to their contextual relationship to each other. In this example, the sentence "A chest CT revealed a 4 cm right upper lobe mass and a 3 cm right mediastinal lymph node" has been parsed out. Groups of words and phrases that are connected to each other are organized into fragments 304 and 306; here the dependent nodes of the anchors "a 4 cm right upper lobe mass" and "a 3 cm right mediastinal lymph node" are grouped into fragments 304 and 306, respectively. The fragments are determined by the parsing algorithms enclosed in this disclosure. The use of conjunctions such as conjunction 302 helps identify fragment boundaries.

Figure 4:
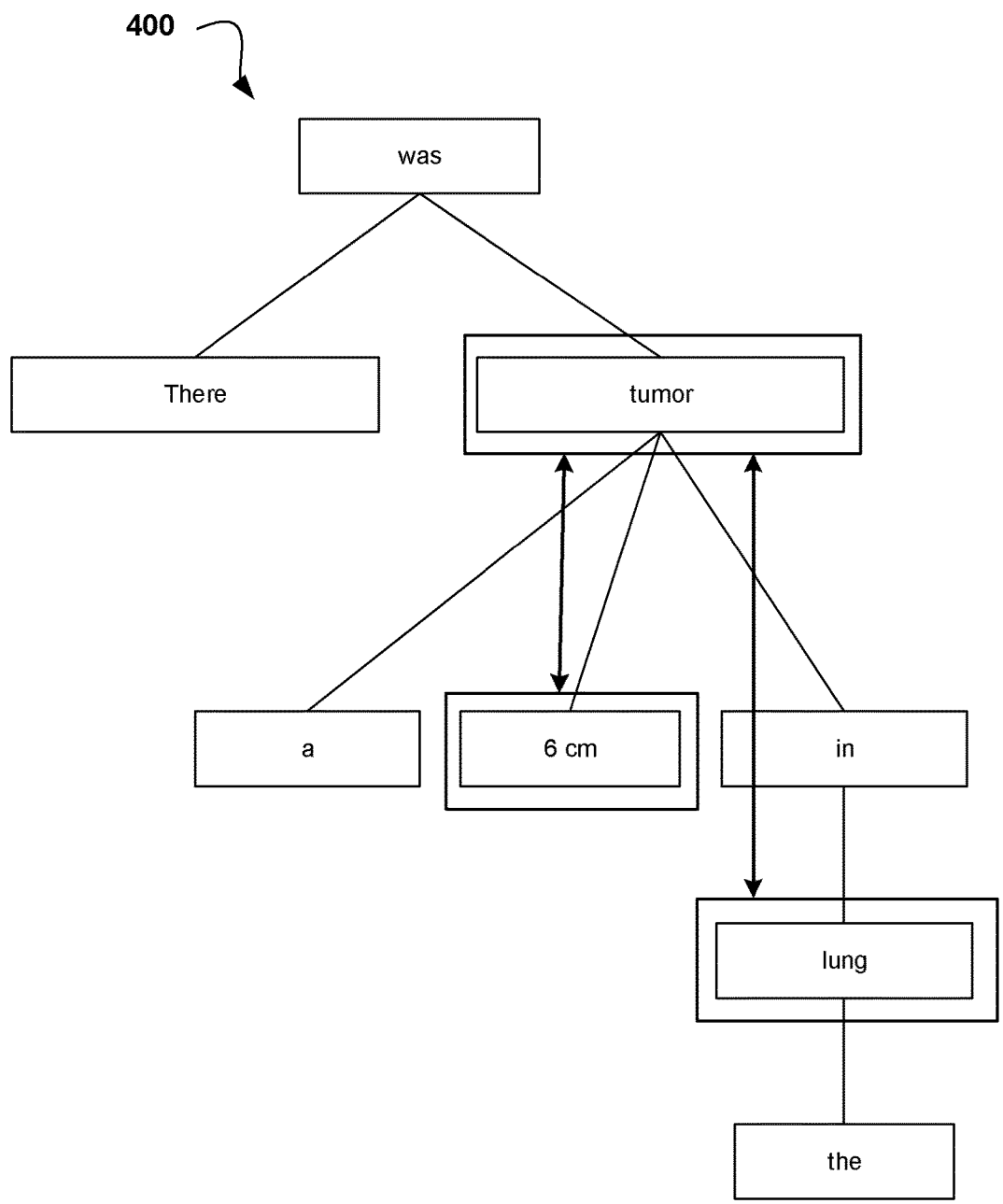
FIG. 4 is a child relationship block diagram illustrating the parent child relationship between nodes in a parse tree relationship algorithm according to at least one embodiment.

FIG. 4 is a child relationship block diagram 400 illustrating an example of a child relationship in a parse tree algorithm. In this example, the phrase "there was a 6 cm tumor in the lung" has been parsed out by the parse tree algorithm. Here, the trigger is 'tumor,' and the anchor is '6 cm.' By finding the relationship between "6 cm" and tumor, it is possible to disambiguate the observation size (6 cm) and convert the observation size to a more specific measurement (e.g., tumor measurement as opposed to lymph node measurement). The parse tree relationship algorithm may also use part of speech tags and slot names, which are tags assigned to nodes of the tree. The use of slot names allows the algorithm to model more nuanced relationships between nodes.

FIG. 5 is a functional block diagram 500 illustrating an example of the shortest path algorithm. The shortest path algorithm may set a pre-defined score if the shortest path distance between the anchor and the trigger is below a threshold. In this figure, the sentence "a core needle biopsy of a lung lesion revealed adenocarcinoma" has been parsed out into a tree structure. The anchor in this example is "lung," and the triggers are "lesion" and "revealed adenocarcinoma."

It may be appreciated that FIGS. 2-5 provide only illustrations of particular implementations and do not imply any limitations with regard to how different embodiments may be implemented. Many modifications to the depicted environments may be made based on design and implementation requirements.

Figure 6:
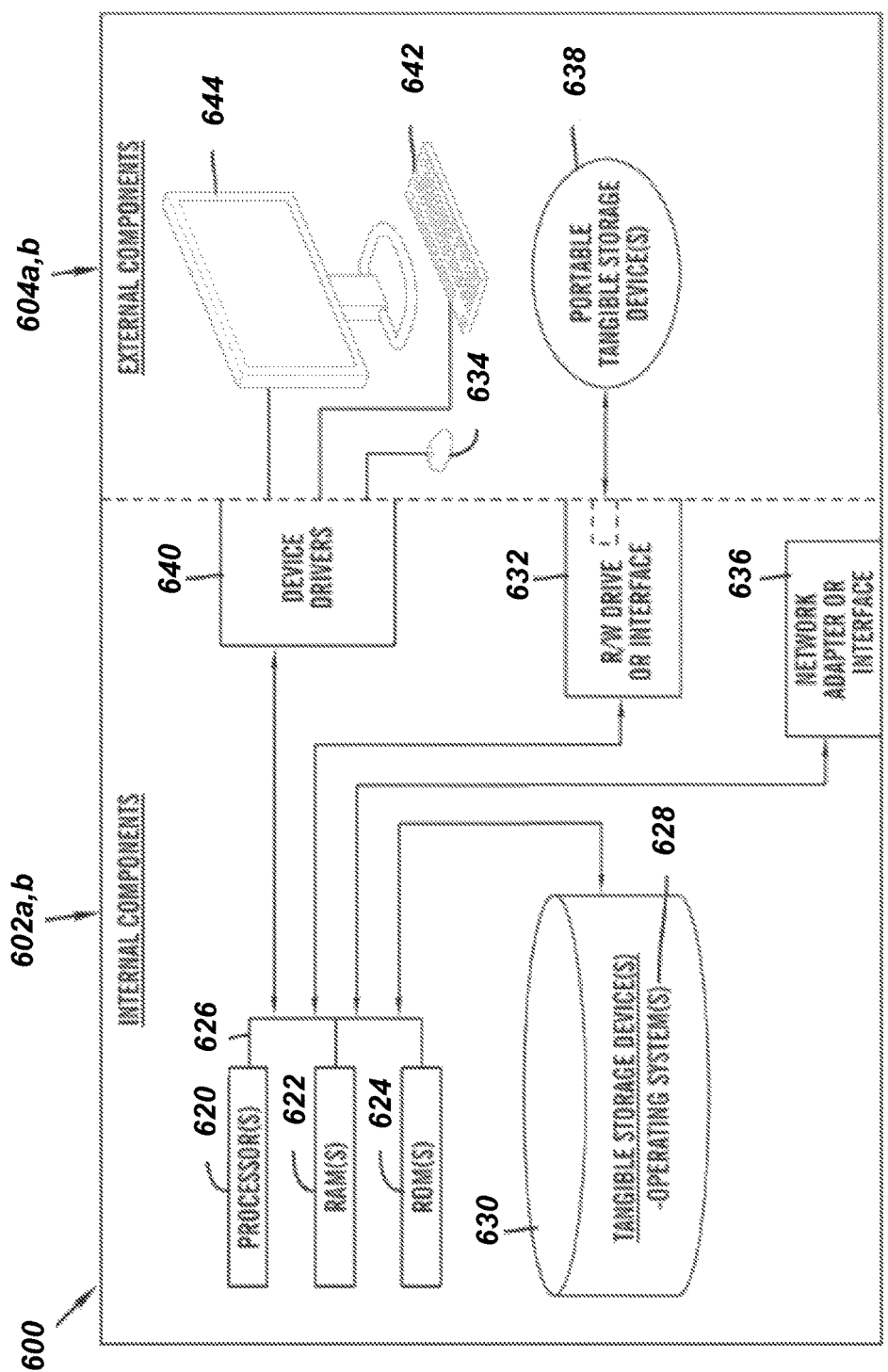
FIG. 6 is a block diagram of internal and external components of computers and servers depicted in FIG. 1 according to at least one embodiment.

FIG. 6 is a block diagram 600 of internal and external components of the client computing device 102 and the server 112 depicted in FIG. 1 in accordance with an embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

The data processing system 602, 604 is representative of any electronic device capable of executing machine-readable program instructions. The data processing system 602, 604 may be representative of a smart phone, a computer system, PDA, or other electronic devices. Examples of computing systems, environments, and/or configurations that may represented by the data processing system 602, 604 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 602 *a,b* and external components 604 *a,b* illustrated in FIG. 6. Each of the sets of internal components 602 include one or more processors 620, one or more computer-readable RAMs 622, and one or more computer-readable ROMs 624 on one or more buses 626, and one or more operating systems 628 and one or more computer-readable tangible storage devices 630. The one or more operating systems 628, the natural language processing pipeline 108 and the natural language context determination program 110A in the client computing device 102, and the natural language context determination program 110B in the server 112 are stored on one or more of the respective computer-readable tangible storage devices 630 for execution by one or more of the respective processors 620 via one or more of the respective RAMs 622 (which typically include cache memory). In the embodiment illustrated in FIG. 6, each of the computer-readable tangible storage devices 630 is a magnetic disk storage device of an internal hard drive. Alternatively, each of the computer-readable tangible storage devices 630 is a semiconductor storage device such as ROM 624, EPROM, flash memory or any other computer-readable tangible storage device that can store a computer program and digital information.

Each set of internal components 602 *a,b* also includes a R/W drive or interface 632 to read from and write to one or more portable computer-readable tangible storage devices 638 such as a CD-ROM, DVD, memory stick, magnetic tape, magnetic disk, optical disk or semiconductor storage device. A software program, such as the cognitive screen protection program 110A, 110B, can be stored on one or more of the respective portable computer-readable tangible storage devices 638, read via the respective R/W drive or interface 632, and loaded into the respective hard drive 630.

Each set of internal components 602 *a,b* also includes network adapters or interfaces 636 such as a TCP/IP adapter cards, wireless Wi-Fi interface cards, or 3G or 4G wireless interface cards or other wired or wireless communication links. The natural language processing pipeline 108 and the natural language context determination program 110A in the client computing device 102 and the natural language context determination program 110B in the server 112 can be downloaded to the client computing device 102 and the server 112 from an external computer via a network (for example, the Internet, a local area network or other, wide area network) and respective network adapters or interfaces 636. From the network adapters or interfaces 636, the natural language processing pipeline 108 and the natural language context determination program 110A in the client computing device 102 and the natural language context determination program 110B in the server 112 are loaded into the respective hard drive 630. The network may comprise copper wires, optical fibers, wireless transmission, routers, firewalls, switches, gateway computers and/or edge servers.

Each of the sets of external components 604 *a,b* can include a computer display monitor 644, a keyboard 642, and a computer mouse 634. External components 604 *a,b* can also include touch screens, virtual keyboards, touch pads, pointing devices, and other human interface devices. Each of the sets of internal components 602 *a,b* also includes device drivers 640 to interface to computer display monitor 644, keyboard 642, and computer mouse 634. The device drivers 640, R/W drive or interface 632, and network adapter or interface 636 comprise hardware and software (stored in storage device 630 and/or ROM 624).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
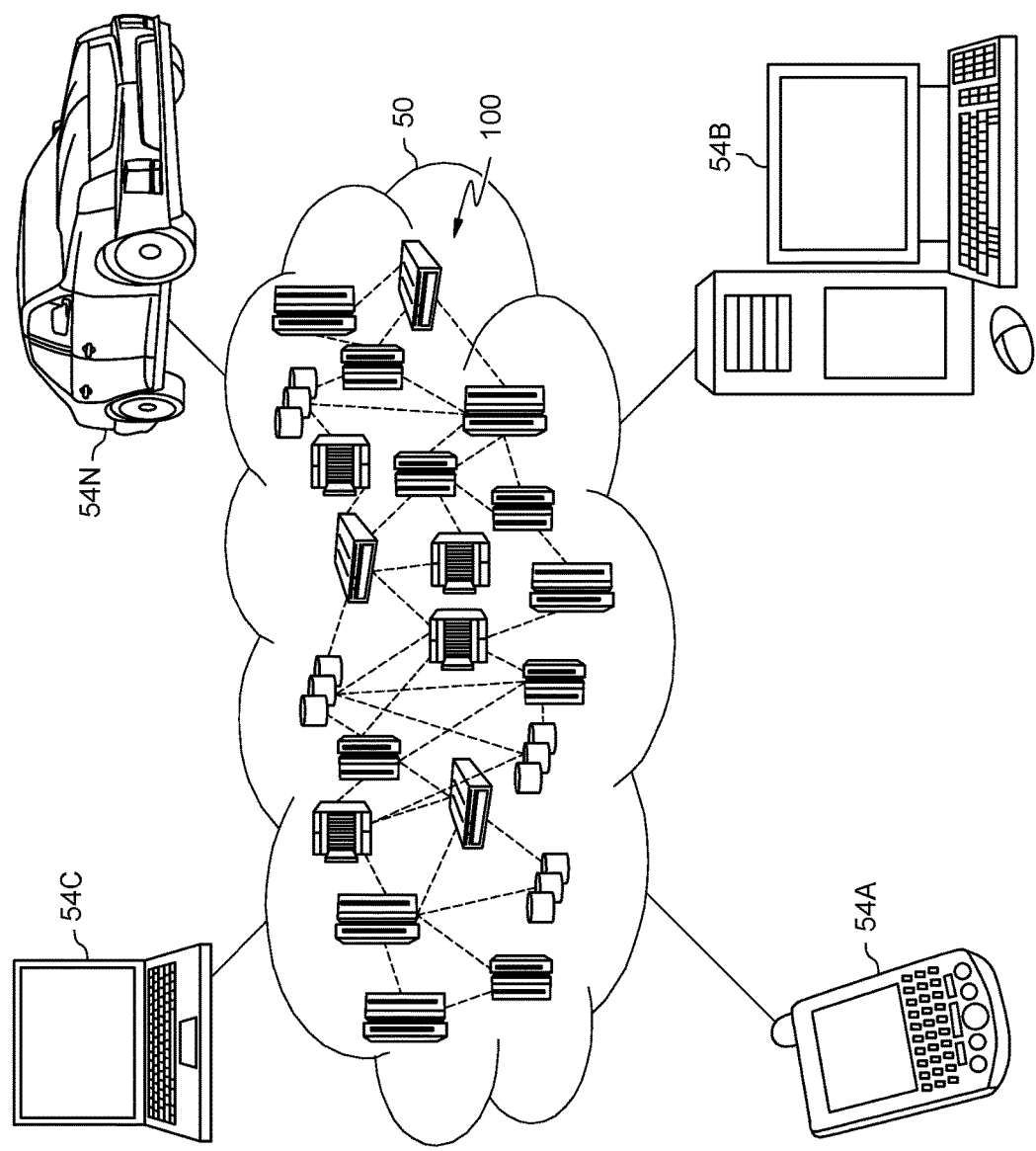
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. The nodes may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 8:
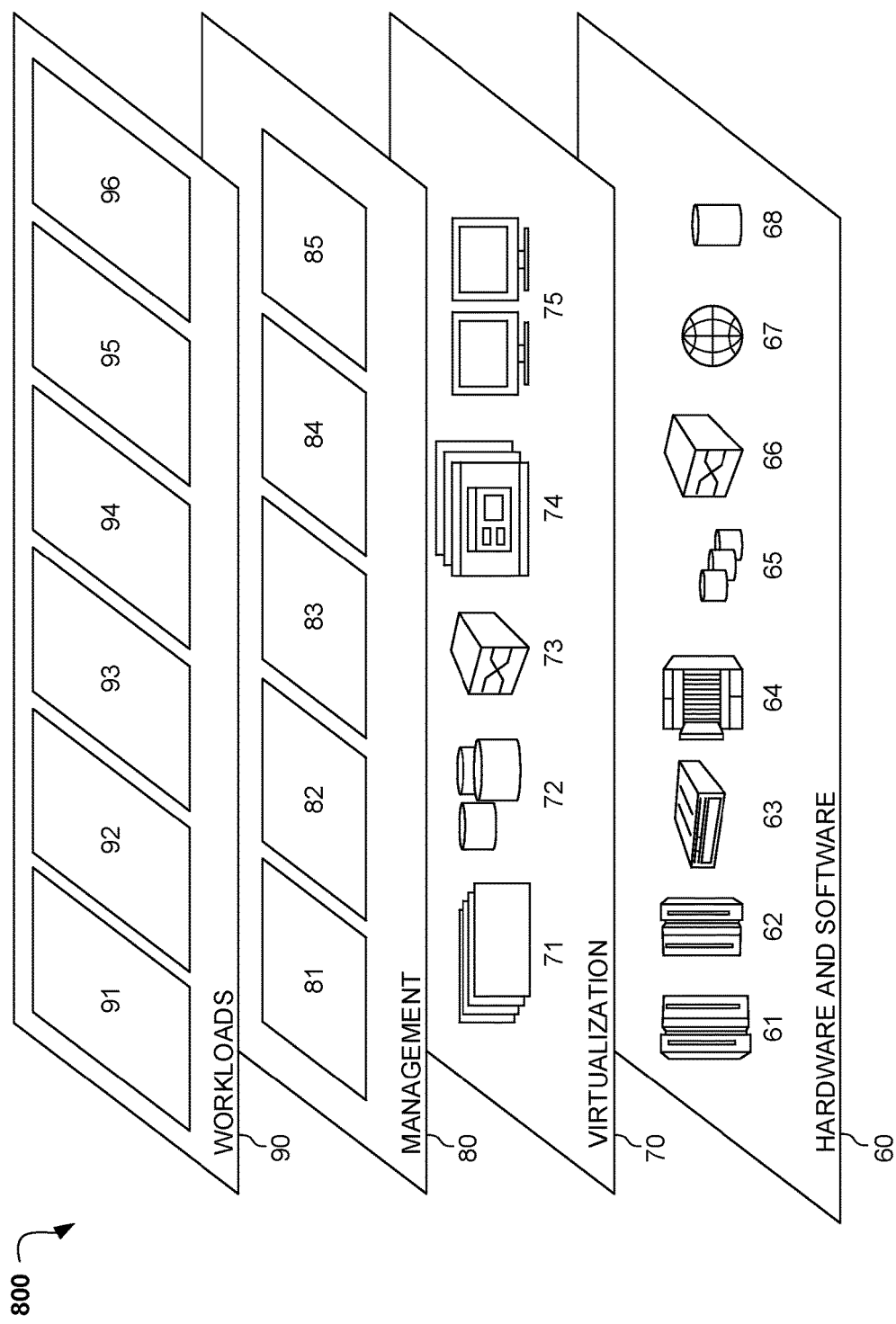
FIG. 8 depicts abstraction model layers according to an embodiment of the present invention.

Referring now to FIG. 8, a set of functional abstraction layers 800 provided by cloud computing environment 50 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and natural language context determination 96. Natural language context determination 96 may relate to utilizing linguistic and lexical features to formulate a score that enumerates the likelihood that two natural language entities are contextually related.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for determining a plurality of relationships between a plurality of natural language entities the method comprising:
   detecting a plurality of natural language entities within a plurality of natural language text;
   running, by a processor, two or more parsing algorithms including a fallback algorithm, a parse tree relationship algorithm, and a shortest path algorithm, simultaneously on the detected plurality of natural language entities to determine a relationship between each natural language entity within the detected plurality of natural language entities;
   assigning, by the two or more parsing algorithms, one or more initial scores to the detected plurality of natural language entities based on the relationship;
   choosing a highest score for the detected plurality of natural language entities from within the assigned one or more initial scores;
   comparing the chosen highest score against a threshold; and determining whether to accept the detected plurality of the natural language entities as being related with the highest score as its conclusion based on the comparison for further natural language processing.

2. The method of claim 1, wherein the two or more parsing algorithms are run on a detected plurality of natural language entities consisting of one anchor and one trigger.

3. The method of claim 1, wherein each pair of natural language entities within the detected plurality of natural language entities is assigned two scores for each algorithm; a generic score and a fragment score.

4. The method of claim 1, wherein two or more initial scores take into account punctuation and one or more conjunctions of the plurality of natural language entities.

5. The method of claim 1, further comprising;
   performing one or more cognitive operations on the detected plurality of natural language entities.

6. The method of claim 3, wherein the highest score is a combination of a generic score and a fragment score.

7. A computer system for determining relationships between natural language entities, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising the steps of:
   detecting a plurality of natural language entities within a plurality of natural language text;
   running two or more parsing algorithms including a fallback algorithm, a parse tree relationship algorithm, and a shortest path algorithm, simultaneously on detected plurality of natural language entities to determine the relationship between said natural language entities;
   assigning, by the two or more parsing algorithms, one or more initial scores to detected plurality of natural language entities based on the relationship between said natural language entities;
   choosing a highest score for plurality of natural language entities;
   comparing the chosen highest score against a threshold; and determining whether to accept the detected plurality of the natural language entities as being related with the highest score as its conclusion based on the comparison for further natural language processing.

8. The computer system of claim 7, wherein the two or more parsing algorithms are run on a detected plurality of natural language entities consisting of one anchor and one trigger.

9. The computer system of claim 7, wherein each plurality of natural language entities is assigned two scores for each algorithm; a generic score and a fragment score.

10. The computer system of claim 7, wherein two or more initial scores take into account punctuation and one or more conjunctions of the plurality of natural language entities.

11. The computer system of claim 7, further comprising the step of:
performing one or more cognitive operations on the plurality of natural language entities.

12. The computer system of claim 7, wherein the final score is a combination of generic and fragment scores, or the final score is the highest initial score.

13. A computer program product for determining relationships between natural language entities, the computer program product comprising:
one or more computer-readable tangible storage medium and program instructions stored on at least one of the one or more tangible storage medium, the program instructions executable by a processor, the program instructions comprising the steps of:
detecting a plurality of natural language entities within a plurality of natural language text;
running two or more parsing algorithms including a fallback algorithm, a parse tree relationship algorithm, and a shortest path algorithm, simultaneously on detected plurality of natural language entities to determine the relationship between said natural language entities;
assigning, by the two or more parsing algorithms, one or more initial scores to detected plurality of natural language entities based on the relationship between said natural language entities;
choosing a highest score for plurality of natural language entities;
comparing the chosen highest score against a threshold; and determining whether to accept the detected plurality of the natural language entities as being related with the highest score as its conclusion based on the comparison for further natural language processing.

14. The computer program product of claim 13, wherein the two or more parsing algorithms are run on a detected plurality of natural language entities consisting of one anchor and one trigger.

15. The computer program product of claim 13, wherein each plurality of natural language entities is assigned two scores for each algorithm; a generic score and a fragment score.

16. The computer program product of claim 13, wherein two or more initial scores take into account punctuation and one or more conjunctions of the plurality of natural language entities.

17. The computer program product of claim 13, further comprising the step of:
performing one or more cognitive operations on the plurality of natural language entities.

* * * * *